United States Patent
Shanava et al.

(10) Patent No.: US 7,623,608 B2
(45) Date of Patent: Nov. 24, 2009

(54) ASYNCHRONOUS DATA RECEPTION WITHOUT PRECISION TIMING REFERENCE

(75) Inventors: Yossi Shanava, Afula (IL); Oren Lavi, Yavne (IL)

(73) Assignee: Microsemi Corp. - Analog Mixed Signal Group Ltd., Hod Hasharon (IL)

( * ) Notice: Subject to any disclaimer, the term of this patent is extended or adjusted under 35 U.S.C. 154(b) by 635 days.

(21) Appl. No.: 11/379,809

(22) Filed: Apr. 24, 2006

(65) Prior Publication Data
US 2006/0262890 A1 Nov. 23, 2006

Related U.S. Application Data

(60) Provisional application No. 60/682,398, filed on May 19, 2005.

(51) Int. Cl.
*H04L 7/00* (2006.01)
(52) U.S. Cl. .................................. 375/355
(58) Field of Classification Search ......... 375/354–355, 375/365, 371
See application file for complete search history.

(56) References Cited

U.S. PATENT DOCUMENTS

| | | | |
|---|---|---|---|
| 6,266,799 B1 * | 7/2001 | Lee et al. ................. 716/6 |
| 7,123,675 B2 * | 10/2006 | Boles et al. .............. 375/354 |
| 7,254,379 B2 * | 8/2007 | Xu et al. .................. 455/296 |
| 2002/0133730 A1 * | 9/2002 | Zabinski et al. .......... 713/400 |
| 2002/0172315 A1 | 11/2002 | Sullivan |
| 2003/0041292 A1 | 2/2003 | Lee et al. |
| 2003/0048209 A1 | 3/2003 | Buchanan et al. |
| 2003/0061564 A1 * | 3/2003 | Maddux ................... 714/798 |
| 2003/0086517 A1 | 5/2003 | Vallet et al. |

FOREIGN PATENT DOCUMENTS

WO PCT/IL2006/000503 7/2006

* cited by examiner

Primary Examiner—Khanh C Tran
(74) Attorney, Agent, or Firm—Simon Kahn

(57) ABSTRACT

A method of asynchronous data reception, the method comprising: receiving a plurality of calibration bits having a bit rate; sampling the received calibration bits at a sampling rate, the sampling rate being in excess of the bit rate; determining, responsive to the sampling, respective indexes for valuing each of the sampled calibration bits; receiving a plurality of data bits having the bit rate; sampling the received plurality of data bits at the sampling rate; and valuing each of the sampled received plurality of data bits responsive to the respective determined indexes.

30 Claims, 4 Drawing Sheets

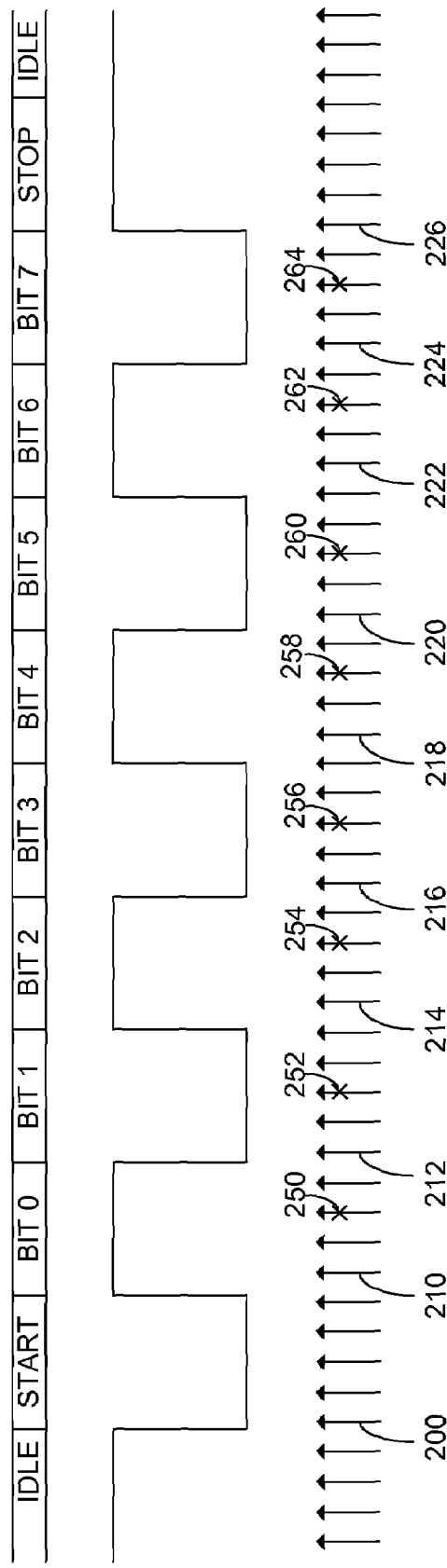

ASYNCHRONOUS DATA RECEPTION WITHOUT PRECISION TIMING REFERENCE

CROSS-REFERENCE TO RELATED APPLICATION

This application claims priority from U.S. Provisional Patent Application Ser. No. 60/682,398 filed May 19, 2005 entitled "Asynchronous Data Transmission without Precision Reference" the entire contents of which is incorporated herein by reference.

BACKGROUND OF THE INVENTION

The present invention relates to the field of asynchronous serial communication, and more particularly to a technique for determining from a received plurality of calibration bits an index for an optimal sampling for each future received bit.

Asynchronous serial data communication is a common method for sending data between electronic devices. Examples of devices employing asynchronous serial data communications include computers, Global Positioning System ("GPS") navigation units, and telecommunications radio receivers. Asynchronous serial data communications systems employ two or more "symbols", or recognizable states of the data line, and convey one or more bits of binary data with each symbol.

In a common asynchronous serial data format used to transmit binary data, two data symbol values are used, corresponding to a data line held at one of two levels ("high" and "low"). During idle periods, the data line is held at a specific level, which may be either high or low according to the convention of the system. To indicate the start of a data sequence, a "start bit" is transmitted with the opposite level. A fixed number of data bits follow, usually eight bits from least significant bit ("LSB", bit 0) to most significant bit ("MSB", bit 7), with the two data levels (high and low) mapped to the two bit values (one and zero) according to the convention of the system. Following bit 7, a final "stop bit" is sent with a level equal to the idle level. The level for each bit, including the start and stop bits, is held on the data line for an identical time interval "t".

Ideally, the device receiving the asynchronous serial data should sample the data line near times 1.5 t, 2.5 t, 3.5 t ... 8.5 t after the leading edge of the start bit. In order to accomplish this, the receiver must know t with a high degree of accuracy. Prior art devices therefore use stable precision timing references, such as crystal oscillators to ensure the required accuracy. A shift of up to 5% in the timing reference is typically the maximum which can be tolerated by prior art devices.

Published U.S. Patent Application S/N 2002/0172315 A1 to Sullivan, published Nov. 21, 2002 entitled "Data Rate Calibration for Asynchronous Serial Communications" discloses a method and apparatus for determining the appropriate timing interval for each bit or data symbol in serial data communications. A pre-determined bit sequence is first sent from a transmitting device to a receiver, the pre-determined bit sequence comprising a marker transition, and the receiver calculates t based on a calibration time interval between the start bit leading edge and the marker transition. Subsequent transmission receipts from the transmitter, as well as transmissions from the receiver are accomplished utilizing the calculated t. Such a technique requires a relatively fast running timer which can accurately calculate the time difference. A single t is used to calculate the sampling time for all received bits, and thus any error or approximation used in calculating t is multiplied across the number of bits in the data stream.

What is needed, and not supplied by the prior art, is a method an apparatus for asynchronous transmission which does not require a precision timer for the transmitter, and preferably one for which an accurate sample is determined for each bit at the receiver, the sample not being dependent on a single calculated timing value.

SUMMARY OF THE INVENTION

Accordingly, it is a principal object of the present invention to overcome the disadvantages of prior art. This is provided in the present invention by providing a method of asynchronous data reception in which a plurality of calibration bits is first received. Preferably the calibration bits comprise 55 hex, thereby presenting a maximal amount of transitions in a single byte. The received calibration bits are sampled and a respective index indicative of a best sample for each bit in the received plurality of bits is found. The respective indexes are stored and used to value all further incoming bits. Incoming data subsequent to the calibration bits are preferably valued in groups of bits of the same length as the calibration bits. Thus, the indexes comprise pointers to the sample number to be utilized for each bit in the subsequent received data.

The invention provides for a method of asynchronous communication, the method comprising: receiving a plurality of calibration bits having a bit rate; sampling the received calibration bits at a sampling rate, the sampling rate being in excess of the bit rate; determining, responsive to the sampling, respective indexes for valuing each of the sampled calibration bits; receiving a plurality of data bits having the bit rate; sampling the received plurality of data bits at the sampling rate; and valuing each of the sampled received plurality of data bits responsive to the respective determined indexes.

In one embodiment the sampling rate is at least 4 times the bit rate, and in another embodiment the sampling rate is at least 10 times the bit rate. In one embodiment the plurality of calibration bits comprises 8 bits, and preferably the plurality of calibration bits represents 55 hex.

In one embodiment the plurality of data bits are valued in groups of bits, the groups of bits having the same number of bits as the number of bits in the plurality of calibration bits. In another embodiment the bit rate drifts from a nominal bit rate in excess of 5%. In another embodiment the calibration bits further comprise a parity bit. In yet another embodiment the plurality of data bits comprises a parity bit.

The invention independently provides for a receiver for asynchronous communication comprising: a means for receiving a plurality of asynchronous serial data bits exhibiting a bit rate, the serial data bits comprising a plurality of calibration bits and a plurality of data bits; a sampling means for sampling the received plurality of serial data bits at a sampling rate; a determining means for determining, responsive to the sampling of the received plurality of calibration bits, a plurality of respective indexes for valuing each of the sampled calibration bits; and a valuing means for valuing each of the sampled received plurality of data bits responsive to the respective determined indexes.

In one embodiment the sampling rate is at least 4 times the bit rate. In another embodiment the sampling rate is at least 10 times the bit rate. In one embodiment the plurality of calibration bits comprises 8 bits, and preferably the plurality of calibration bits represents 55 hex.

In one embodiment the plurality of data bits are valued in groups of bits, the groups of bits having the same number of bits as the number of bits in the plurality of calibration bits. In another embodiment the bit rate drifts in excess of 5% from a nominal bit rate.

In one embodiment the calibration bits comprise a parity bit. In another embodiment the plurality of data bits comprises a parity bit. In yet another embodiment the sampling means comprises an analog to digital converter.

The invention independently provides for a receiver for asynchronous data communication comprising: an input port arranged to receive asynchronous data communication, the asynchronous data communication comprising a plurality of calibration bits and a plurality of data bits; a bit sampler arranged to sample the received asynchronous data communication at a sampling rate; an index determining functionality operative to determine, responsive to the sampled received plurality of calibration bits, a plurality of respective indexes for valuing each of the sampled calibration bits; and a bit valuing functionality operative to assign a value for each of the sampled received plurality of data bits responsive to the respective determined indexes.

In one embodiment the sampling rate is at least 4 times the bit rate. In another embodiment the sampling rate is at least 10 times the bit rate. In yet another embodiment the plurality of calibration bits comprises 8 bits, and preferably the plurality of calibration bits represents 55 hex.

In one embodiment the plurality of data bits are valued in groups of bits, the groups of bits having the same number of bits as the number of bits in the plurality of calibration bits. In another embodiment the bit rate drifts in excess of 5% of nominal bit rate. In one embodiment the calibration bits comprise a parity bit and in another embodiment the plurality of data bits comprises a parity bit. In yet another embodiment the bit sampler comprises an analog to digital converter.

In an exemplary embodiment the asynchronous data comprises changes in current flow over an Ethernet cable.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 2 illustrates a plurality of calibration bits received at a receiver in accordance with the principle of the invention;

FIG. 3 illustrates a sample array of pointers for an exemplary embodiment of 8 bits;

DETAILED DESCRIPTION OF PREFERRED EMBODIMENTS

Figure 1:
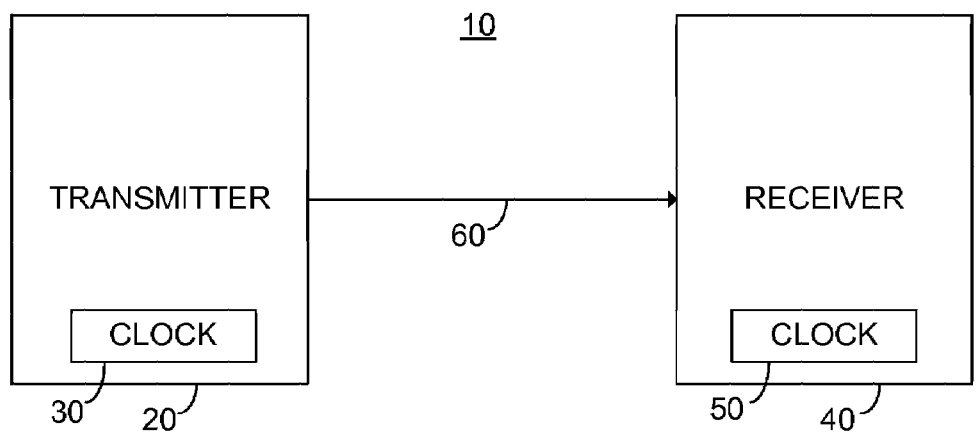
FIG. 1 illustrates a high level block diagram of an asynchronous communication system in accordance with the principle of the invention.

The present embodiments enable a method of asynchronous data reception which does not require precision timing. The method allows for a difference between the actual clock rate of the transmitting device and that of the receiving device in excess of 5%. A plurality of calibration bits, preferably 8 bits, and even further preferably 8 bits representing 55 hexadecimal, are sent as a header from the transmitter to the receiver. The receiver samples the calibration bits at a sampling rate in excess of the bit rate, and finds an index for each bit in the plurality of calibration bits indicative of the appropriate sample number to be used. The indexes are used to select the appropriate sample for valuing subsequently received bits in the transmission.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 illustrates a high level block diagram of an asynchronous communication system 10 in accordance with the principle of the invention, comprising a transmitter 20 exhibiting a clock 30 and a receiver 40 exhibiting a clock 50. Transmitter 20 is connected via a data transmission path 60 to receiver 40. In an exemplary embodiment, transmitter 20 is a powered device receiving power over Ethernet from receiver 40, as further described in pending U.S. patent application Ser. No. 10/961,108 filed Oct. 12, 2004 entitled "Powered Device Interface Circuit" the contents of which are incorporated herein by reference. In the exemplary embodiment transmitter 20 transmits data, including a plurality of calibration bits as will be described further hereinto below, in response to sensing a voltage indicative of remote powering over transmission path 60 comprising communication cabling.

Clock 30 of transmitter 20 is used to determine the bit rate of data being transmitted. Clock 50 of receiver 40 is used to sample data and calibration bits received from transmitter 20. Clock 30 is asynchronous to clock 50, and in one embodiment does not comprise a precision clocking mechanism. Clock 30 thus may exhibit a difference in relation to the actual clocking rate of clock 50 in excess of 5%. Clock 50 need not comprise a precision clocking mechanism.

FIG. 2 illustrates a plurality of calibration bits received at a receiver in accordance with the principle of the invention. In the embodiment illustrated the plurality of calibration bits comprises a start bit followed by 8 bits, denoted bit 0-bit 7. Following bit 7 is a stop bit, where the transmission path 60 remains at the idle value for at least one bit length. The above is not meant to be limiting in any way, and the plurality of calibration bits may be more or less than 8 bits, and may include a parity bit and more than one stop bit without exceeding the scope of the invention.

The calibration bits illustrated represented a hexadecimal 55, which advantageously exhibits a transition between 0 and 1 at the start of each bit. The incoming bits are sampled, responsive to clock 50, as indicated by the up arrows below the data stream. It is to be noted that the incoming bits are sampled at a rate in excess of the bit rate, and further that the sampling clock is asynchronous to the received bits. In the embodiment illustrated the sampling is accomplished at a rate more than 4 times the bit rate. In an exemplary embodiment the sampling is accomplished at a rate more than 10 times the bit rate. An increased sampling rate further allows an increase in clock rate differentials.

Samples of transmission path 60 during the idle period exhibit a value of 1. At sample 200, a value of 0 is read indicative of a transition. Since this transition is the first after the idle bits, this transition is indicative of the beginning of a start bit.

Samples of transmission path 60 during the period of the start bit continue to show a 0 value. At the beginning of bit 0, a transition is detected by sample 210, and subsequent samples exhibit a value of 1 until sample 212. At sample 212 a transition to a 0 value is detected, as sample 212 and subsequent values exhibit a value of 0 representative of bit 1. Similarly, at sample 214 a transition to a value of 1 representing the beginning of bit 2 is exhibited, and at sample 216 a transition to a value of 0 representing the beginning of bit 3 is exhibited. At sample 218 a transition to a value of 1 representing the beginning of bit 4 is exhibited, and at sample 220 a transition to a value of 0 representing the beginning of bit 5 is exhibited. At sample 222 a transition to a value of 1 representing the beginning of bit 6 is exhibited, and at sample 224 a transition to a value of 0 representing the beginning of bit 7 is exhibited. At sample 226 a transition to a value of 1 representing the beginning of a stop bit and subsequent idle time is exhibited.

Thus, the use of a 55 hexadecimal bit pattern generates a transition between a 1 and 0 value at the start of each bit, which is detected by the change in value of the first sample read after receipt of the beginning of the bit.

The above has been described in a quiet environment in which a transmitted 1 value is received consistently as a 1 value, and a transmitted 0 value is received consistently as a 0 value. This is not meant to be limiting in any way, and is specifically meant to include filtering the received bits to adjust for noise. In one embodiment a single sample value which differs from the surrounding sample values, representative of a noise induced error, is corrected by the filtering mechanism changing the single sample value to be equal to the surrounding sample values.

An index pointer for a suggested sample for each detected bit is calculated. In one embodiment a single sample at the midpoint between transitions is selected. In another embodiment a plurality of samples around the midpoint between transitions is selected. The index pointers for each bit are stored, preferably in an array. FIG. 3 illustrates a sample array for an exemplary embodiment of 8 bits. For each bit of the 8 bits an index is stored, pointing to the appropriate sample number, or numbers, to be used for valuing the bit. In the exemplary embodiment a bit 0 index is indicative of the number of the sample denoted 250; a bit 1 index is indicative of the number of the sample denoted 252; a bit 2 index is indicative of the number of the sample denoted 254; a bit 3 index is indicative of the number of the sample denoted 256; a bit 4 index is indicative of the number of the sample denoted 258; a bit 5 index is indicative of the number of the sample denoted 260; a bit 6 index is indicative of the number of the sample denoted 262; and a bit 7 index is indicative of the number of the sample denoted 264.

Receiver 40 upon sensing the transition of a start bit may sample a sufficient number of times to ensure receipt of the calibration bits. In an exemplary embodiment sampling is initially set to a pre-determined number of samples greater than the expected transmission time of the calibration bits. Thus, in the event of an expected bit rate for which an imprecise clock is used, an appropriate number of samples are input to ensure that the entirety of the calibration bits has been sampled. In one embodiment the expected length of time plus 20% is used for receipt of the calibration bits.

The receipt of the calibration bits further serves to notify receiver 40 of the expected number of samples required to sample an incoming group of bits. Preferably clocks 30 and 50 are each relatively stable over the transmission of both the calibration bits and the subsequent data bits. It is to be understood that the sampling rate required is a function of the stability of the transmission rate over the calibration bits and the subsequent data bits, and thus an increase in sampling rate may compensate for a reduced transmission rate stability.

Figure 4:
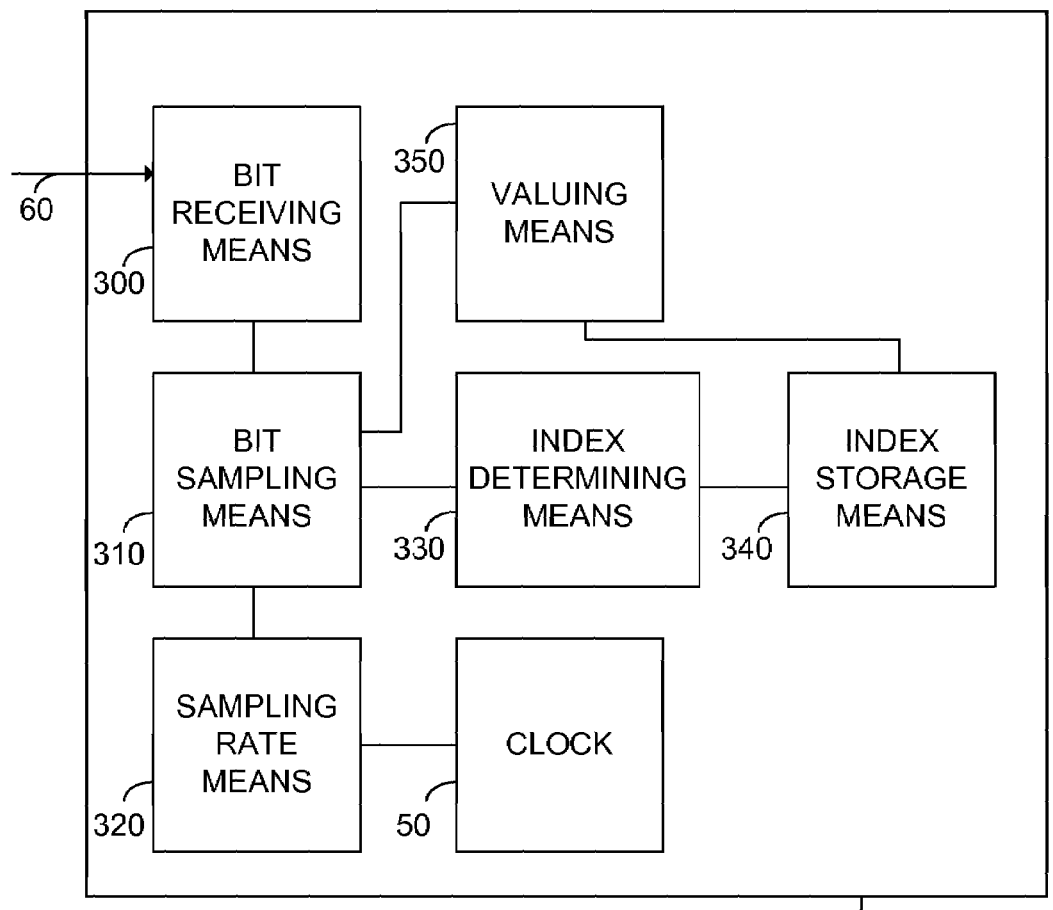
FIG. 4 illustrates a high level functional block diagram of a receiver in accordance with the principle of the invention.

FIG. 4 illustrates a high level functional block diagram of a receiver 40 in accordance with the principle of the invention comprising: clock 50; transmission path 60; bit receiving means 300; bit sampling means 310; sampling rate means 320; index determining means 330; index storage means 340 and bit valuing means 350. Bit receiving means 300 is associated with transmission path 60 and bit sampling means 310; and sampling rate means 320 is associated with bit sampling means 310 and clock 50. Index determining means 330 is associated with bit sampling means 310 and index storage means 340 is associated with index determining means 330. Bit valuing means 350 is associated with index storage means 340 and bit sampling means 310.

In operation, bit receiving means 300, which in an exemplary embodiment comprises the input of an A/D converter, detects incoming symbol values represented by various states of transmission path 60. Bit sampling means 310 samples the value of the incoming symbols at a regular rate, the rate being controlled by sampling rate means 320 responsive to clock 50. In an exemplary embodiment bit sampling means 310 comprises an A/D converter. Index determining means 330 functions to identify, based on a received plurality of calibration bits, an index or pointer for each bit in a group of bits to be received by bit receiving means 300. Preferably the number of bits in the group of bits is the same as the number of calibration bits. In an exemplary embodiment the number of bits is 8. Index determining means 330 may comprise appropriate software implemented on one of a microcontroller, microcomputer, state machine or other computing device.

Index storage means 340, which in an exemplary embodiment comprises a register, temporarily stores the indexes identified by index determining means 330. Bit valuing means 350 assigns a value to the bit by utilizing the sample or samples pointed to by the index stored in index storage means 340. Bit valuing means 350 may comprise appropriate software implemented on one of a microcontroller, microcomputer, state machine or other computing device. Thus, upon receipt of a group of bits by bit receiving means 300, sampled by bit sampling means 310, a value is assigned by reference to the appropriate sample number for each bit in accordance with the indexes stored by index storage means 340. In one embodiment bit valuing means 350 further comprises a filtering means which functions to filter the sampled bits to adjust for noise. In one embodiment a single sample value which differs from the surrounding sample values, representative of a noise induced error, is corrected by the filtering means to be equal to the surrounding sample values. Filtering means may comprise appropriate software implemented on one of a microcontroller, microcomputer, state machine or other computing device.

Figure 5:
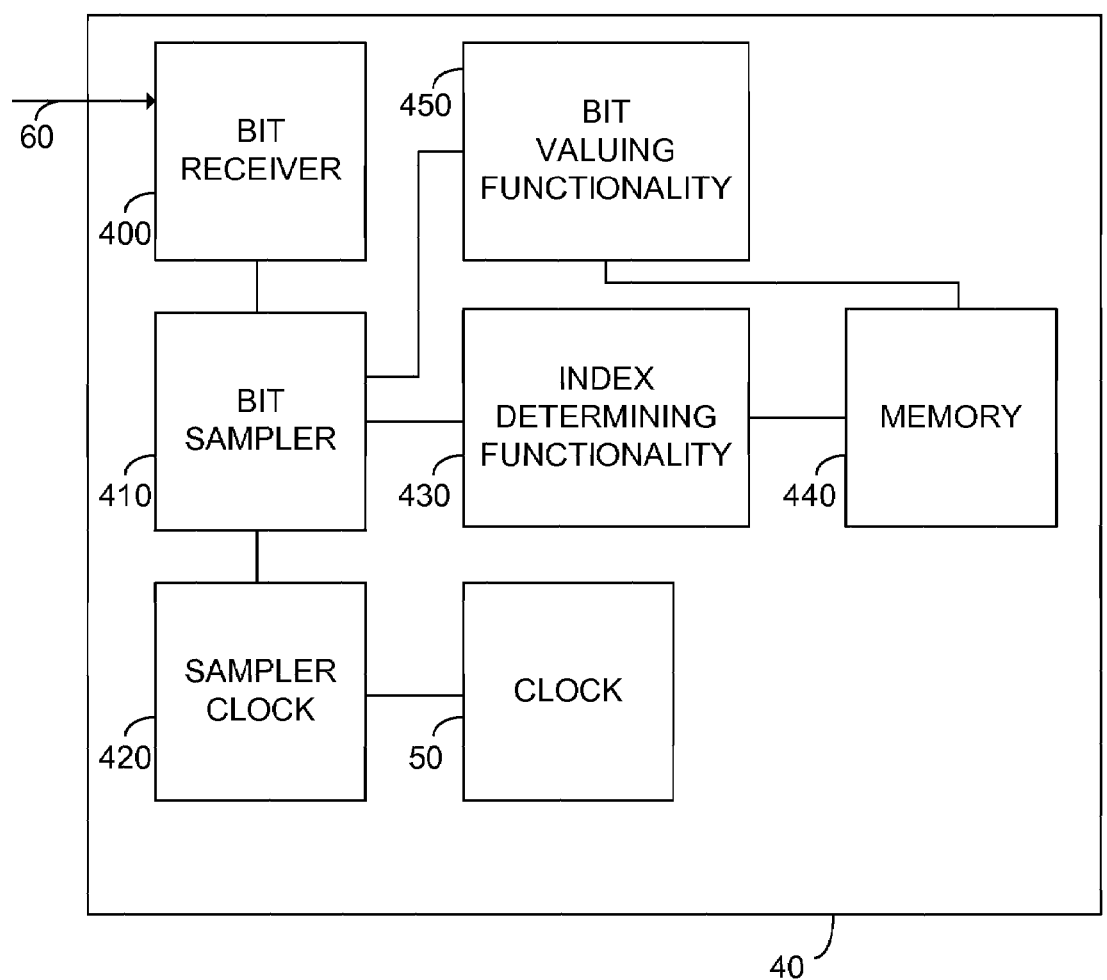
FIG. 5 illustrates a high level block diagram of a receiver in accordance with the principle of the invention.

FIG. 5 illustrates a high level block diagram of a receiver 40 in accordance with the principle of the invention comprising: clock 50; transmission path 60; bit receiver 400; bit sampler 410; sampler clock 420; index determining functionality 430; memory 440; and bit valuing functionality 450. Bit receiver 400 is associated with transmission path 60 and bit sampler 410; bit sampler 410 is associated with sampler clock 420; and bit sampler clock 420 is associated with clock 50. Index determining functionality 430 is associated with bit sampler 410 and memory 440 is associated with index determining functionality 430. Bit valuing functionality 450 is associated with memory 440 and bit sampler 410.

In operation, bit receiver 400, which in an exemplary embodiment comprises a current sensing circuit for power over Ethernet, receives incoming symbol values represented by various states of transmission path 60. Bit sampler 410, which in an exemplary embodiment comprises an A/D converter samples the value of the incoming symbols at a regular rate, the rate being controlled by sampler clock 420 responsive to clock 50. Index determining functionality 430 functions to identify, based on a received plurality of calibration bits, an index pointing to the appropriate sample for each bit in a group of bits to be received by bit receiver 400. Preferably the number of bits in the group of bits is the same as the number of calibration bits. In an exemplary embodiment the number of bits is 8.

Figure 6:
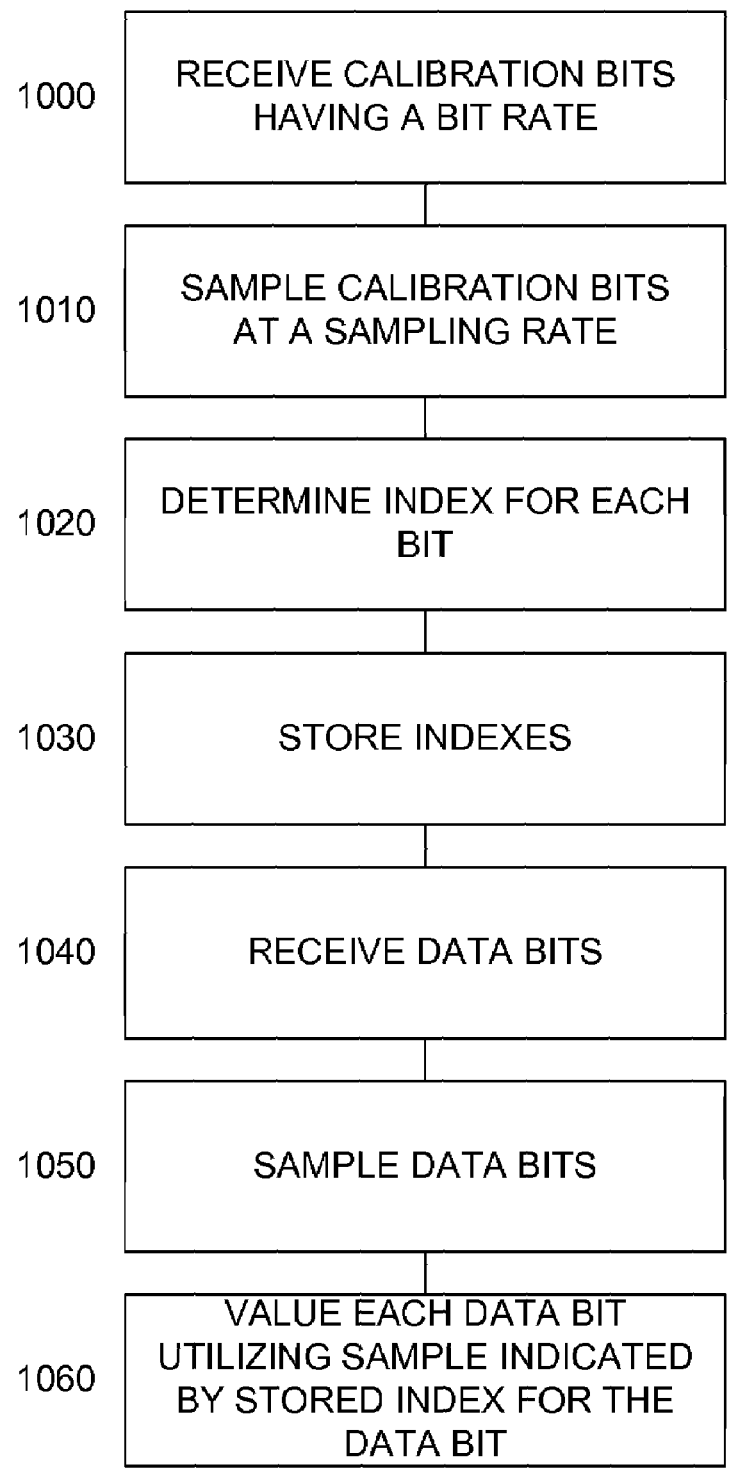
FIG. 6 illustrates a high level flow chart of the operation of a receiver in accordance with the principle of the invention.

Memory 440, which in an exemplary embodiment comprises a register, temporarily stores the indexes identified by index determining functionality 430. Bit valuing functionality 450 assigns a value to the bit based on the index stored in memory 440. Thus, upon receipt of a group of bits by bit receiver 400, sampled by bit sampler 410, a value is assigned by reference to the appropriate sample number for each bit in accordance with the indexes stored in memory 440. In one embodiment bit valuing functionality 450 further comprises a filtering functionality which filters the sampled bits to adjust for noise. In one embodiment a single sample value which differs from the surrounding sample values, representative of a noise induced error, is corrected by the filtering functionality of bit valuing functionality 450 to be equal to the surrounding sample values FIG. 6 illustrates a high level flow chart of the operation of receiver 40 in accordance with the principle of the invention. In stage 1000 a plurality of calibration bits exhibiting a bit rate is received. In an exemplary embodiment the calibration bits exhibit a detectable transition for each bit. In stage 1010 the received calibration bits are sampled at a sampling bit rate. In stage 1020 an index is determined for each bit based on the calibration bits. The index represents a pointer to the best sample, or best samples, to be used for valuing each bit. In an exemplary embodiment, the pointer represents the sample number of a midpoint between detected transitions. In another embodiment a plurality of samples are used, the plurality of samples being within a predetermined number of samples of the midpoint. In an exemplary embodiment the index refers to the number of samples from the detection of a start bit.

In stage 1030 the indexes found in stage 1020 are stored. In stage 1040 a plurality of data bits are received and in stage 1050 the received bits are sampled. In an exemplary embodiment the grouping of received data bits is associated with the number of data bits in the plurality of calibration bits. In stage 1060 the data bits are valued based on the sample or samples associated with the indexes stored in stage 1030.

Thus, the present embodiments enable a method of asynchronous data reception which does not require precision timing. The method allows for skew between the clock of the transmitting device and that of the receiving device in excess of 5%. A plurality of calibration bits, preferably 8 bits, and even further preferably 8 bits representing 55 hexadecimal, are sent as a header from the transmitter to the receiver. The receiver samples the calibration bits at a sampling rate at least 4 times the bit rate, preferably at least 10 times the data rate, and finds an index for each bit in the plurality of calibration bits indicative of the appropriate sample number to be used. The indexes are used to select the appropriate sample for valuing subsequently received bits in the transmission.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description and which are not in the prior art.

We claim:

1. A method of asynchronous data reception, the method comprising:
receiving a plurality of calibration bits having a bit rate;
providing a bit sampler;
sampling said received calibration bits at a sampling rate via said provided bit sampler, said sampling rate being in excess of said bit rate;
determining, responsive to said sampling, respective indexes for valuing each of said sampled calibration bits;
receiving a plurality of data bits having said bit rate;
sampling said received plurality of data bits at said sampling rate via said provided bit sampler; and
automatically valuing each of said sampled received plurality of data bits responsive to said respective determined indexes.

2. A method according to claim 1, wherein said sampling rate is at least 4 times said bit rate.

3. A method according to claim 1, wherein said sampling rate is at least 10 times said bit rate.

4. A method according to claim 1, wherein said plurality of calibration bits comprises 8 bits.

5. A method according to claim 4, wherein said plurality of calibration bits represents 55 hex.

6. A method according to claim 1, wherein said plurality of data bits are valued in groups of bits, said groups of bits having the same number of bits as the number of bits in said plurality of calibration bits.

7. A method according to claim 1, wherein said bit rate drifts from a nominal bit rate in excess of 5%.

8. A method according to claim 1, wherein said calibration bits further comprise a parity bit.

9. A method according to claim 1, wherein said plurality of data bits comprises a parity bit.

10. A receiver for asynchronous communication comprising:
 a means for receiving a plurality of asynchronous serial data bits exhibiting a bit rate, said serial data bits comprising a plurality of calibration bits and a plurality of data bits;
 a sampling means for sampling said received plurality of serial data bits at a sampling rate;
 a determining means for determining, responsive to said sampling of said received plurality of calibration bits, a plurality of respective indexes for valuing each of said sampled calibration bits; and
 a valuing means for valuing each of said sampled received plurality of data bits responsive to said respective determined indexes.

11. A receiver according to claim 10, wherein said sampling rate is at least 4 times said bit rate.

12. A receiver according to claim 10, wherein said sampling rate is at least 10 times said bit rate.

13. A receiver according to claim 10, wherein said plurality of calibration bits comprises 8 bits.

14. A receiver according to claim 13, wherein said plurality of calibration bits represents 55 hex.

15. A receiver according to claim 10, wherein said plurality of data bits are valued in groups of bits, said groups of bits having the same number of bits as the number of bits in said plurality of calibration bits.

16. A receiver according to claim 10, wherein said bit rate drifts in excess of 5% from a nominal bit rate.

17. A receiver according to claim 10, wherein said calibration bits comprise a parity bit.

18. A receiver according to claim 10, wherein said plurality of data bits comprises a parity bit.

19. A receiver according to claim 10, wherein said sampling means comprises an analog to digital converter.

20. A receiver for asynchronous data communication comprising:
 an input port arranged to receive asynchronous data communication, said asynchronous data communication comprising a plurality of calibration bits and a plurality of data bits;
 a bit sampler arranged to sample said received asynchronous data communication at a sampling rate;
 an index determining functionality operative to determine, responsive to said sampled received plurality of calibration bits, a plurality of respective indexes for valuing each of said sampled calibration bits; and
 a bit valuing functionality operative to assign a value for each of said sampled received plurality of data bits responsive to said respective determined indexes.

21. A receiver according to claim 20, wherein said sampling rate is at least 4 times said bit rate.

22. A receiver according to claim 20, wherein said sampling rate is at least 10 times said bit rate.

23. A receiver according to claim 20, wherein said plurality of calibration bits comprises 8 bits.

24. A receiver according to claim 23, wherein said plurality of calibration bits represents 55 hex.

25. A receiver according to claim 20, wherein said plurality of data bits are valued in groups of bits, said groups of bits having the same number of bits as the number of bits in said plurality of calibration bits.

26. A receiver according to claim 20, wherein said bit rate drifts in excess of 5% of nominal bit rate.

27. A receiver according to claim 20, wherein said calibration bits comprise a parity bit.

28. A receiver according to claim 20, wherein said plurality of data bits comprises a parity bit.

29. A receiver according to claim 20, wherein said bit sampler comprises an analog to digital converter.

30. A receiver according to claim 20, wherein said asynchronous data transmission comprises changes in current flow over an Ethernet cable.

* * * * *